(12) United States Patent
Salter

(10) Patent No.: US 7,777,117 B2
(45) Date of Patent: *Aug. 17, 2010

(54) SYSTEM AND METHOD OF INSTRUCTING MUSICAL NOTATION FOR A STRINGED INSTRUMENT

(75) Inventor: Hal C. Salter, Seffner, FL (US)

(73) Assignee: Hal Christopher Salter, Boulder, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/426,140

(22) Filed: Apr. 17, 2009

(65) Prior Publication Data
US 2009/0235808 A1 Sep. 24, 2009

Related U.S. Application Data

(63) Continuation-in-part of application No. 11/737,734, filed on Apr. 19, 2007, now Pat. No. 7,521,619.

(51) Int. Cl.
G09B 15/00 (2006.01)
G09B 15/02 (2006.01)
G10H 1/00 (2006.01)

(52) U.S. Cl. ............... 84/477 R; 84/470 R; 84/479 R; 84/483.2; 84/485 R

(58) Field of Classification Search ............ None
See application file for complete search history.

(56) References Cited

U.S. PATENT DOCUMENTS

| 3,662,641 | A | 5/1972 | Bulla, Jr. | |
|---|---|---|---|---|
| 3,837,256 | A | 9/1974 | Gullickson | |
| 3,897,711 | A | 8/1975 | Elledge | |
| 3,991,648 | A | 11/1976 | Karpowicz | |
| D255,803 | S | 7/1980 | Leal | |
| D256,366 | S | 8/1980 | Dworsky | |
| 4,235,141 | A | 11/1980 | Eventoff | |
| 4,339,979 | A | 7/1982 | Norman | |
| RE031,019 | E | 8/1982 | Evangelista | |
| 4,430,918 | A | 2/1984 | Meno | |
| 4,559,861 | A * | 12/1985 | Patty et al. | 84/470 R |
| 4,570,521 | A | 2/1986 | Fox | |
| 4,763,558 | A | 8/1988 | Johnson, Jr. | |
| 4,794,838 | A | 1/1989 | Corrigau, III | |
| D310,090 | S | 8/1990 | Stone et al. | |
| 4,966,052 | A * | 10/1990 | Shiraki et al. | 84/715 |
| D312,264 | S | 11/1990 | Amiya | |

(Continued)

*Primary Examiner*—Marlon T Fletcher
(74) *Attorney, Agent, or Firm*—Webb IP Law Group; Jason P. Webb; Danny Y. H. Cheng

(57) ABSTRACT

A method of instructing a user to read musical notation through interaction with a graphical user interface and an input instrument representative of a stringed instrument may include the steps of generating the graphical user interface having a first mode. The first mode may include a virtual fingerboard positioned substantially along a vertical extreme of the interface, the virtual fingerboard may include a first linear array representing a first string having a first frequency range. The virtual fingerboard may also include a second linear array representing a second string having a second frequency range, wherein the second frequency range overlaps the first frequency range associated with a string. Furthermore, the virtual fingerboard may additionally include a plurality of note positions, each note position having a corresponding fingerboard position on the input instrument.

13 Claims, 3 Drawing Sheets

U.S. PATENT DOCUMENTS

| | | | |
|---|---|---|---|
| 5,040,447 A | 8/1991 | Murata et al. | |
| 5,085,119 A | 2/1992 | Cole | |
| 5,095,799 A | 3/1992 | Wallace et al. | |
| 5,121,668 A | 6/1992 | Segan et al. | |
| 5,162,603 A | 11/1992 | Bunker | |
| 5,167,179 A | 12/1992 | Yamauchi et al. | |
| 5,214,231 A | 5/1993 | Ernst et al. | |
| 5,223,659 A * | 6/1993 | Shiraki et al. | 84/669 |
| D349,127 S | 7/1994 | Nelson | |
| 5,373,768 A | 12/1994 | Sciortino | |
| 5,380,948 A | 1/1995 | Freimuth | |
| 5,401,898 A | 3/1995 | Usa et al. | |
| 5,403,972 A | 4/1995 | Valentine, Sr. | |
| 5,496,179 A | 3/1996 | Hoffman | |
| 5,644,096 A * | 7/1997 | Bull | 84/485 SR |
| 5,691,490 A | 11/1997 | Williams | |
| 5,777,251 A | 7/1998 | Hotta et al. | |
| 5,796,025 A | 8/1998 | Haake | |
| 6,018,119 A | 1/2000 | Mladek | |
| 6,107,557 A | 8/2000 | Fukada | |
| 6,162,981 A * | 12/2000 | Newcomer et al. | 84/485 R |
| 6,188,008 B1 | 2/2001 | Fukata | |
| 6,201,174 B1 | 3/2001 | Eller | |
| 6,225,544 B1 | 5/2001 | Sciortino | |
| 6,225,547 B1 | 5/2001 | Toyama et al. | |
| 6,252,153 B1 | 6/2001 | Toyama | |
| 6,255,547 B1 | 7/2001 | Smuda | |
| 6,323,411 B1 | 11/2001 | Fukata | |
| 6,337,433 B1 | 1/2002 | Nishimoto | |
| 6,342,665 B1 | 1/2002 | Okita et al. | |
| 6,380,474 B2 | 4/2002 | Taruguchi et al. | |
| 6,390,923 B1 | 5/2002 | Yoshitomi et al. | |
| 6,444,891 B1 | 9/2002 | Koo | |
| 6,452,080 B1 | 9/2002 | Coonce | |
| 6,452,081 B1 | 9/2002 | Ravagni et al. | |
| 6,501,011 B2 | 12/2002 | Wesley | |
| 6,515,211 B2 | 2/2003 | Umezawa et al. | |
| 6,541,688 B2 | 4/2003 | Asahi | |
| 6,541,692 B2 | 4/2003 | Miller | |
| 6,555,737 B2 | 4/2003 | Miyaki et al. | |
| 6,605,767 B2 | 8/2003 | Fiks et al. | |
| 6,660,921 B2 | 12/2003 | Deverich | |
| 6,660,922 B1 | 12/2003 | Roeder | |
| 6,781,049 B2 | 8/2004 | Taylor | |
| 6,791,568 B2 | 9/2004 | Steinberg et al. | |
| 6,821,203 B2 | 11/2004 | Suga et al. | |
| 6,915,488 B2 | 7/2005 | Omori et al. | |
| 6,987,220 B2 | 1/2006 | Holcombe | |
| 6,995,310 B1 | 2/2006 | Knapp et al. | |
| 7,026,538 B2 | 4/2006 | Komano et al. | |
| 7,109,407 B2 | 9/2006 | Hasegawa | |
| 7,129,407 B2 | 10/2006 | Hiratsuka et al. | |
| 7,174,510 B2 | 2/2007 | Salter | |
| 7,186,910 B2 | 3/2007 | Sakurai et al. | |
| 7,345,236 B2 * | 3/2008 | Worrall et al. | 84/722 |
| 2002/0011142 A1 | 1/2002 | Mead | |
| 2002/0029681 A1 | 3/2002 | Manning | |
| 2002/0194983 A1 | 12/2002 | Tanner | |
| 2003/0131721 A1 | 7/2003 | Minakuchi et al. | |
| 2004/0074379 A1 | 4/2004 | Ludwig | |
| 2004/0112204 A1 | 6/2004 | Javelle | |
| 2004/0206225 A1 | 10/2004 | Wedel | |
| 2005/0016353 A1 | 1/2005 | Reierson | |
| 2005/0034591 A1 | 2/2005 | Chang | |
| 2005/0126368 A1 * | 6/2005 | Harrison | 84/471 R |
| 2005/0172785 A1 | 8/2005 | Fisher-Robbins et al. | |
| 2005/0183566 A1 | 8/2005 | Nash | |
| 2005/0183567 A1 | 8/2005 | Aoki et al. | |
| 2006/0191399 A1 * | 8/2006 | Miyaki | 84/613 |
| 2006/0196343 A1 | 9/2006 | Yung | |
| 2007/0234878 A1 * | 10/2007 | Worrall et al. | 84/485 R |
| 2009/0064849 A1 * | 3/2009 | Festejo | 84/485 R |

* cited by examiner

SYSTEM AND METHOD OF INSTRUCTING MUSICAL NOTATION FOR A STRINGED INSTRUMENT

CROSS-REFERENCE TO RELATED APPLICATIONS

This application is a Continuation in Part application of, under 35U.S.C. §121, and claims priority to, under 35U.S.C. §121, U.S. Non-Provisional application Ser. No. 11/737,734, entitled System and Method of Instructing Musical Literacy and Performance of a Stringed Instrument, by Salter, filed on Apr. 19, 2007 now U.S. Pat. No. 7,521,619, which application is incorporated by reference herein in its entirety.

BACKGROUND OF THE INVENTION

1. Field of the Invention

The present invention relates to systems and methods of instructing and displaying musical notation, specifically to systems and methods of instructing and displaying musical notation for stringed instruments.

2. Description of the Related Art

Students learning a musical instrument face many challenges. Indeed, a beginning student may spend considerable time and effort in simply becoming familiar with even the basics of playing a musical instrument. Some of these challenges facing beginning students include: learning notes and pitches, hand and fingering positions, and reading and understanding the music and music notation associated with the particular instrument. In many cases, the challenges a beginning student faces may considerably decrease a student's enjoyment and desire to put in the necessary time and effort to become proficient. Unfortunately, as a result, many students abandon the musical instrument for other pursuits.

Beginning students of stringed musical instruments, such as the violin, guitar, cello, etc., face the additional challenge of coordinating hand positions and pitches with the printed music. Indeed, even if a student already knows how to read music, they still must learn which finger to use on which string, and in which hand position along the fingerboard they should place their fingers in order to produce the desired notes. Accordingly, many tools have been developed to further automate or otherwise facilitate musical instrument instruction.

In particular, with the advent of the computer, musical notation and other instruction software has been developed with the purpose of simplifying and instructing a person to play and enjoy stringed musical instruments. Electronics and computer-related technologies such as MIDI (Musical Instrument Digital Interface) have been increasingly applied to musical instruments over the years; thus, greatly enhancing the ability for learning, creating, playing, and understanding stringed instrument musical compositions.

While such technology has greatly enhanced the ability to learn, play, and understand stringed music compositions, many of the current systems and methods utilizing these technologies are complex, expensive, and may require a user to have substantial musical experience and training. Additionally, while some systems and methods are adept and proficient in one area of music instruction and display, those same systems and methods may be inadequate in other areas. For example, one system may excel in instruction of playing and learning musical notation, while being inadequate and inept in areas of creating and promoting a fun and inviting atmosphere, and vice versa. Therefore, people have continually worked to produce different and/or better systems and methods of enhancing musical composition. Examples include, but are not limited to, the references described below, which references are incorporated by reference herein:

U.S. Pat. No. 7,174,510, issued to Salter, discloses a musical keyboard is connected to a computer. The computer implements a graphical user interface for teaching users to play the musical instrument. A computer readable music file, such as a MIDI file, is used to drive the creation of game objects that travel from a point of origination along a path toward a key of a virtual keyboard. In one form, when a user presses a key of the musical keyboard within a certain time window of arrival of the game object at the corresponding key of the virtual keyboard, the user is awarded with an audio presentation, a visual presentation and/or with game points.

U.S. Pat. No. 6,018,119, issued to Mladek, discloses a stringless fret instrument to be played as on a twitch instrument consists of the neck on which there are frets located transversely to a lengthwise axis of the neck, between which there are situated, in rows parallel with the axis of the neck, digital tone push-buttons, and of the body equipped with the management of the synthesizer accompaniment, a loudspeaker and a direct current charger. Above each row of digital tone push-buttons, there is a flexible rope situated in a lengthwise rabbet created in the neck parallel with the lengthwise axis of the neck movable in the direction to digital tone push-buttons, fixed at least on the neck behind the side digital tone push-button. The management of the synthesizer accompaniment consists of three mutually parallel rows of keys each of which consisting of four tone keys.

U.S. Pat. No. 7,026,538, issued to Komano et al., discloses a tone generation apparatus is removably attachable to a plug-in board for generating a tone on the basis of performance information and extending the tone generating function of the tone generation apparatus. Tone color name information and tone color parameter name information of tone color data possessed by the attached plug-in board is stored in a nonvolatile memory. The nonvolatile memory can also store tone color data of a custom voice obtained by editing original tone color data of the plug-in board.

U.S. Pat. No. 6,605,767, issued to Fiks et al., discloses a musical learning system including an instrument and method is disclosed. The instrument is comprised of a rectangularly shaped box designed for convenient handling by an operator in a manner analogous to other musical instruments such as a piano, a guitar, or a horn. Thirteen movable buttons on the top surface of the box sound eight natural notes and five notes of sharps and flats when pressed by the operator, the sounds being produced by either a built-in, acoustic or electronic sound system. Removable attachments having instructive musical notations are temporarily secured above and below the buttons can be used in a predetermined sequence. In addition, in the electronic version, an "octave-up" switch enables an operator to sound a note one or more octaves higher for each of the buttons; and a "mute" bar allows the operator to silence a note being produced, if desired.

U.S. Pat. No. 6,515,211, issued to Umezawa et al, discloses a display device is supplied with basic screen display data for displaying a basic screen including a plurality of chord names to be indicated on the basic screen, and displays the basic screen on the basis of the basic screen display data. For example, the basic screen may be one listing names of chords to be used in a selected music piece in accordance with progression of the selected music piece. There is provided a memory storing, for each chord, playing-manner screen display data for displaying a playing manner screen indicative of a model playing manner corresponding to the chord. On the basis of an instruction by a user, a desired chord is selected from among the plurality of chord names indicated on the basic screen displayed on the display device, and the playing-manner screen display data corresponding to the selected chord name are read out from the memory. The display device displays, along with the basic screen, the playing manner screen indicative of the model playing manner corresponding to the selected chord name on the basis of the playing-manner screen display data read out from the memory. The display device may simultaneously display playing manner screens for a plurality of different chords. Also, the display device may display the playing manner screen in a highlighted fashion.

U.S. Patent Application Publication No. 2006/0191399, by Miyaki, discloses a fingering guidance image for guiding a fingering upon performing a chord of a stringed instrument to a user is displayed on a display device. This fingering guidance image includes a musical instrument image indicating a guitar, a depressed pointer arranged at the position in the musical instrument image that is depressed upon performing a chord and a fingering image indicating fingers in the form of performing a chord, among which the fingering image is made to be a transmitting image.

The inventions heretofore known suffer from a number of disadvantages which include: difficulty of use, especially for younger users; a high learning curve; failure to provide an intuitive interface; failure to enhance and create learning enjoyment; failure to provide sufficient guidance and/or skill enhancing effects; and/or so forth.

What is needed is a system and method of instructing and displaying musical notation for a stringed instrument that solves one or more of the problems described herein and/or one or more problems that may come to the attention of one skilled in the art upon becoming familiar with this specification.

SUMMARY OF THE INVENTION

The present invention has been developed in response to the present state of the art, and in particular, in response to the problems and needs in the art that have not yet been fully solved by currently available system and method of instructing musical literacy and performance of a stringed instrument. Accordingly, the present invention has been developed to provide an efficient and effective method of instructing a user to read musical notation through interaction with a graphical user interface and an input instrument representative of a stringed instrument.

A method of instructing a user to read musical notation through interaction with a graphical user interface and an input instrument representative of a stringed instrument may include the steps of generating the graphical user interface having a first mode. The first mode may include a virtual fingerboard positioned substantially along a vertical extreme of the interface. The virtual fingerboard may include a first linear array representing a first string having a first frequency range. The virtual fingerboard may also include a second linear array representing a second string having a second frequency range, wherein the second frequency range overlaps the first frequency range associated with a string. Furthermore, the virtual fingerboard may additionally include a plurality of note positions, each note position having a corresponding fingerboard position on the input instrument.

The first linear array, the second linear array, and the plurality of note positions may form a grid, wherein the grid may display the first linear array and the second linear array in a second mode such that portions of the first linear array and the second linear array having overlapping frequency ranges are substantially vertically aligned. The method may also incorporate a music file into the graphical user interface, wherein the music file may contain data corresponding to an arrangement of a plurality of musical notes in sequence, having a rhythmic pattern, and represented by at least one game object; directing the game object in substantially vertical and substantially straight trajectory toward a note position on the virtual fingerboard corresponding to the musical notes. The method further includes adjusting a toggle module configured to selectively toggle the second linear array between able and disabled modes. The toggle module may comprise an auto module, configured to selectively toggle the second linear array to an auto mode; a manual module, configured to selectably toggle the second linear array to a manual mode; and a tempo module, configured to adjust the tempo of the second linear array. The toggle module may also include a string select module configured to select a string of the second linear array to be displayed about the grid.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order for the advantages of the invention to be readily understood, a more particular description of the invention briefly described above will be rendered by reference to specific embodiments that are illustrated in the appended drawing(s). It is noted that the drawings of the invention are not to scale. The drawings are mere schematics representations, not intended to portray specific parameters of the invention. Understanding that these drawing(s) depict only typical embodiments of the invention and are not, therefore, to be considered to be limiting of its scope, the invention will be described and explained with additional specificity and detail through the use of the accompanying drawing(s), in which.

DETAILED DESCRIPTION OF THE INVENTION

Figure 1:
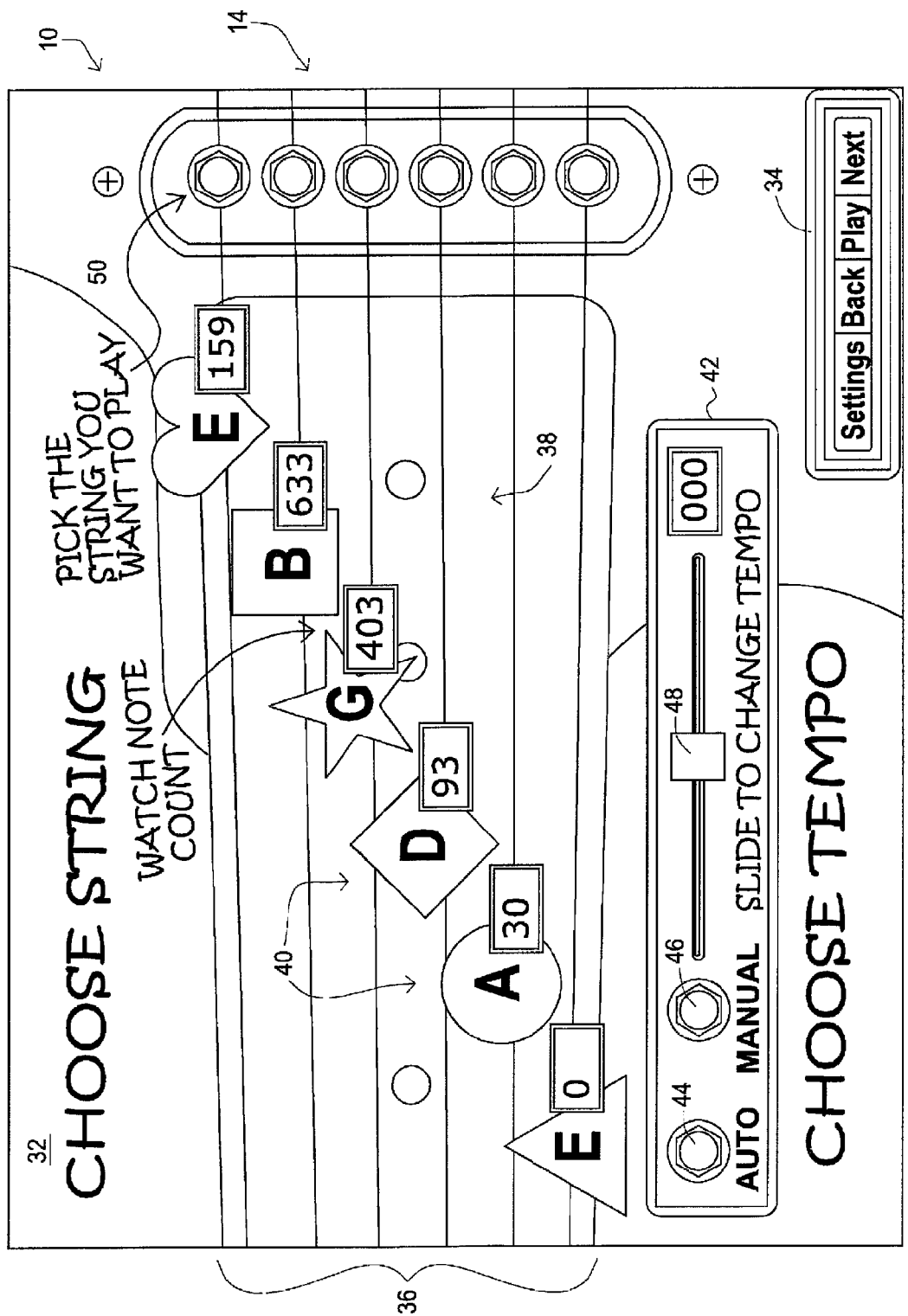
FIG. 1 is a perspective view of a method of instructing a user to read musical notation through interaction with a graphical user interface and an input instrument representative of a stringed instrument, according to one embodiment of the invention.
Figure 2:
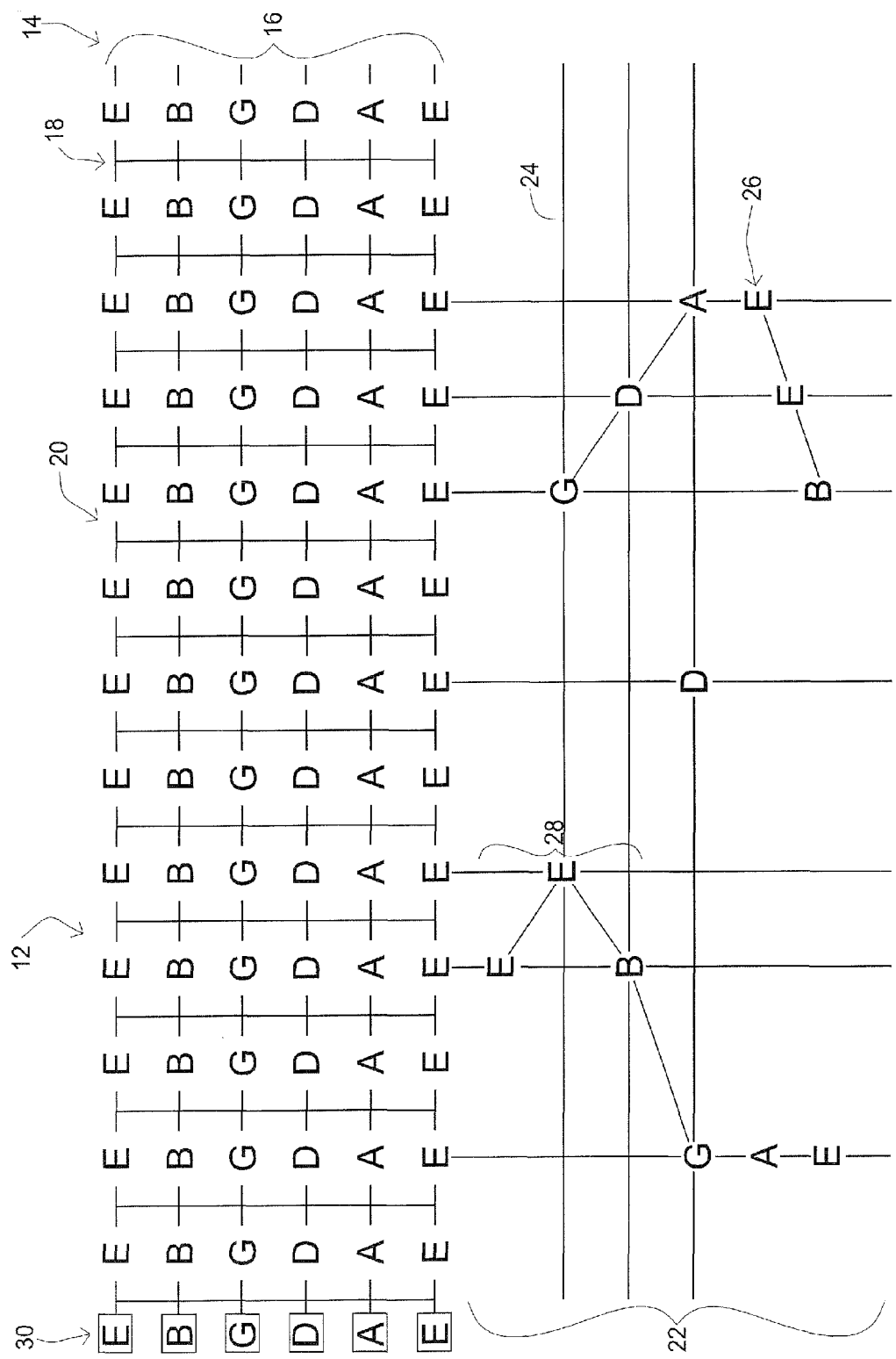
FIG. 2 is a perspective view of a method of instructing a user to read musical notation through interaction with a graphical user interface and an input instrument representative of a stringed instrument, according to one embodiment of the invention.
Figure 3:
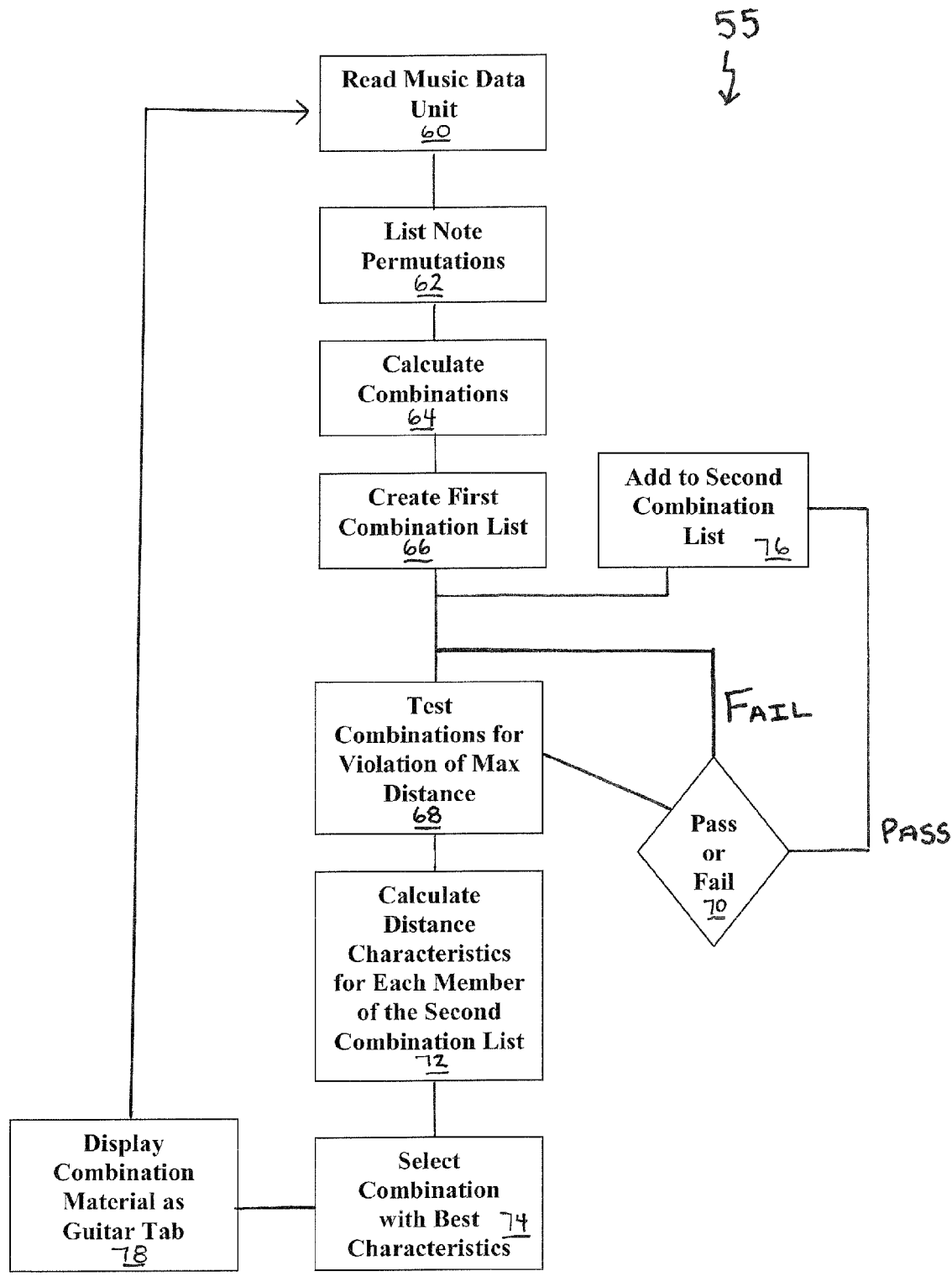
FIG. 3 is flow diagram of a method of instructing a user to read musical notation through interaction with a graphical user interface and an input instrument representative of a stringed instrument, according to one embodiment of the invention.

For the purposes of promoting an understanding of the principles of the invention, reference will now be made to the exemplary embodiments illustrated in the drawing(s), and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

Reference throughout this specification to an "embodiment," an "example" or similar language means that a particular feature, structure, characteristic, or combinations thereof described in connection with the embodiment is included in at least one embodiment of the present invention. Thus, appearances of the phrases an "embodiment," an "example," and similar language throughout this specification may, but do not necessarily, all refer to the same embodiment, to different embodiments, or to one or more of the figures. Additionally, reference to the wording "embodiment," "example" or the like, for two or more features, elements, etc. does not mean that the features are necessarily related, dissimilar, the same, etc.

Each statement of an embodiment or example is to be considered independent of any other statement of an embodiment despite any use of similar or identical language characterizing each embodiment. Therefore, where one embodiment is identified as "another embodiment," the identified embodiment is independent of any other embodiments characterized by the language "another embodiment." The features, functions, and the like, described herein are considered to be able to be combined in whole, or in part, one with another, as the claims and/or art may direct, either directly or indirectly, implicitly or explicitly.

As used herein, "comprising," "including," "containing," "is," "are," "characterized by," and grammatical equivalents thereof are inclusive or open-ended terms that do not exclude additional unrecited elements or method steps. "Comprising" is to be interpreted as including the more restrictive terms "consisting of" and "consisting essentially of."

MIDI defines an interface for exchanging information between electronic musical instruments, computers, sequencers, lighting controllers, mixers, and tape recorders as discussed in MIDI Manufacturers Association publication entitled, MIDI 1.0 Detailed Specification (1990). MIDI is extensively used both in the recording studio and in live performances and has had enormous impact in the areas of studio recording and automated control, audio video production and composition. By itself and in conjunction with other media, MIDI plays an integral role in the application of computers to multimedia applications.

In comparison to digital audio, MIDI files take up much less space and the information is symbolic for convenient manipulation and viewing. For example, a typical three minute MIDI file may require 30 to 60 Kilobytes on a disk, whereas a CD quality stereo audio file requires about two hundred Kilobytes per second or 36 Megabytes for three minutes. MIDI data may appear as musical notation, graphical piano-roll, or lists of messages suitable for editing and reassignment to different instruments.

General MIDI has standardized instrument assignments to greatly motivate the multimedia title producer. MIDI input and output ports are used to route time-stamped MIDI packets from one media component to another. MIDI ports act as mailboxes for the communication of MIDI packets across address spaces. Many interesting MIDI applications can be created by connecting media components that contain MIDI ports. For example, a MIDI player and a MIDI interface can be used to play a music device, like an electronic player piano or a guitar, connected to a computer. MIDI packets are sent from the MIDI player to the MIDI interface. The MIDI interface converts the MIDI packets to MIDI data that is sent to the player instrument piano or guitar for playback.

Additionally, certain MIDI files and songs are already broken up into 'tracks' or channels which may be the equivalent of voice, or orchestral parts, or simply the treble and bass clefs. Players are able to select which tracks or combination of tracks are to be included in the game, again this will affect the score as to what percentage of the total song these tracks include. The selection of songs, then number or choice of tracks, and then tempo are the principle ways that the player can determine the level of the game, and the focus of the repetition. This is further taught in U.S. Pat. application No. 2004/0137984, which is incorporated by reference herein.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of programmable or executable code may, for instance, comprise of one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module and/or a program of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist merely, at least partially, as electronic signals on a system or network.

The various system components and/or modules discussed herein may include one or more of the following: a host server or other computing systems including a processor for processing digital data; a memory coupled to said processor for storing digital data; an input digitizer coupled to the processor for inputting digital data; an application program stored in said memory and accessible by said processor for directing processing of digital data by said processor; a display device coupled to the processor and memory for displaying information derived from digital data processed by said processor; and a plurality of databases. As those skilled in the art will appreciate, any computers discussed herein may include an operating system (e.g., Windows NT, 95/98/2000, Vista, OS2, UNIX, Linux, Solaris, MacOS, etc.) as well as various conventional support software and drivers typically associated with computers. The computers may be in a home or business environment with access to a network. An embodiment of the invention may operate on a game console, such as those produced by Nintendo, Microsoft, and/or Sony. In an exemplary embodiment, access is through the Internet through a commercially-available web-browser software package.

As set forth in the specification, the system and method of the invention may facilitate the providing information to participants through multiple media sources and may allow one or more modules to receive information via similar multiple media sources. The multiple media sources may include; for example, chat room, radio, bulletin board, internet web pages, email, billboards, newsletters, commercials and/or the like. The present invention may be described herein in terms of functional block components, screen shots, optional selections and various processing steps. It should be appreciated that such functional blocks may be realized by any number of hardware and/or software components configured to perform the specified functions.

For example, the present invention may employ various integrated circuit components, e.g., memory elements, processing elements, logic elements, look-up tables, and the like, which may carry out a variety of functions under the control of one or more microprocessors or other control devices. Similarly, the software elements of the present invention may be implemented with any programming or scripting language such as C, C++, C-Sharp, AJAX, Java, COBOL, assembler, PERL, Visual Basic, SQL Stored Procedures, extensible markup language (XML), with the various algorithms being implemented with any combination of data structures, objects, processes, routines or other programming elements. Further, it should be noted that the present invention may employ any number of conventional techniques for data transmission, signaling, data processing, network control, and the like.

Additionally, many of the functional units and/or modules herein are described as being "in communication" with other functional units and/or modules. Being "in communication" refers to any manner and/or way in which functional units and/or modules, such as but not limited to, computers, laptop computers, PDAs, modules, and other types of hardware and/or software, may be in communication with each other. Some non-limiting examples include communicating, sending, and/or receiving data and/or metadata via: a network, a wireless network, software, instructions, circuitry, phone lines, internet lines, carrier signals, satellite signals, electric signals, electrical and magnetic fields, and/or pulses, and/or so forth.

As used herein, the term "network" may include any electronic communications means which incorporates both hardware and software components of such. Communication among the parties in accordance with the present invention may be accomplished through any suitable communication channels, such as, a telephone network, an extranet, an intranet, Internet, point of interaction device (point of sale device, personal digital assistant, cellular phone, kiosk, etc.), online communications, off-line communications, wireless communications, transponder communications, local area network (LAN), wide area network (WAN), networked or linked devices and/or the like. Moreover, although the invention may be implemented with TCP/IP communications protocols, the invention may also be implemented using IPX, Appletalk, IP-6, NetBIOS, OSI or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997), the contents of which are hereby incorporated by reference.

Music generally includes a plurality of musical events, usually notes, arranged according to a predetermined timing and often including other characteristics such as pitch, attack, duration, etc. These musical events may be stored as data, wherein each event may be accompanied by metadata describing one or more characteristics of the event. Further, musical events may be embodied in musical notation, such as but not limited to standard musical notation; wherein events and their characteristics may be graphically displayed as notes on a page. The notes, the score, key notation, and other visual indicators provide information about these events.

Looking to the figures, a method of instructing a user to read musical notation through interaction with a graphical user interface and an input instrument representative of a stringed instrument 10, according to one embodiment of the invention, is illustrated wherein the method 10 includes generating a graphical user interface. The graphical user interface includes a first mode 12, wherein a virtual fingerboard 14 is positioned substantially along a vertical extreme of the interface. The virtual fingerboard 14 includes a first linear array 16, wherein the first linear array 16 represents a first string 18 having a first frequency range 20. The virtual fingerboard 14 also includes a second linear array 22, wherein the second linear array 22 represents a second string 24 having a second frequency range 26. In addition, the second frequency range 26 overlaps the first frequency range 20 associated with a string.

The virtual fingerboard 14 further includes a plurality of note positions 28, wherein each note position has a corresponding fingerboard position on the input instrument. The first linear array 16, the second linear array 22, and the plurality of note positions 28 form a grid 30. The graphical user interface also includes a second mode 32, wherein the first and second linear arrays 16 and 22 are displayed such that portions of the first linear array 16 and the second linear array 22 have overlapping frequency ranges which are substantially vertically aligned. The method also includes incorporating a music file 34 into the graphical user interface, wherein the music file 34 contains data corresponding to an arrangement of a plurality of musical notes 36 in sequence, having a rhythmic pattern 38, and represented by at least one game object. The method further includes directing the game object in substantially vertical and substantially straight trajectory toward a note position 40 on the virtual fingerboard corresponding to the musical notes. The method still further includes adjusting a toggle module 42, wherein the toggle module 42 is configured to selectively toggle the second linear array 22 between able and disabled modes.

The toggle module 42 includes an auto module 44, wherein the auto module 44 is configured to selectively toggle the second linear array 22 to an auto mode. The toggle module 42 also includes a manual module 46, wherein the manual module 46 is configured to selectively toggle the second linear array 22 to a manual mode. The toggle module 42 further includes a tempo module 48, wherein the toggle module 42 is configured to adjust the tempo of the second linear array 22. In addition, the toggle module 42 includes a string select module 50, wherein the string select module 50 is configured to select a string of the second linear array 22. By selecting a string, a user may be able choose which strings will be displayed on the graphical user interface. A user may concentrate on a particular string or strings to focus on the graphical user interface.

The game object also includes identifying marks, wherein the marks are associated with a note position. The identifying marks include grid notation associated with selecting a note position on a particular linear array. The game objects are generated by a game object generation module, wherein the object generation module includes a object generation process 55. The process 55 includes reading music data 60, and generating an initial permutation list of degenerate note position possibilities for the note information read from the music data 62. In addition, the process 55 includes calculating the combinations 64 and generating an initial combination for related notes from the music data 66. The process 55 further includes testing the elements of the initial combination list for suitability 68 and selecting a combination from the combination list. The step of testing the elements of the initial combination list for suitability 68 includes calculating a maximum fret distance between notes of a chord and comparing that maximum fret distance against a pass/fail threshold 70. If the maximum fret distance passes the threshold, then the element is included to a second combination list 76, wherein the second combination is included with the first combination list and then further tested. The testing step also includes calculating a distance characteristic of a plurality of combinations from the initial combinations list 72.

The step of calculating a maximum fret distance 68 includes determining a fret distance between a pair of note positions in a chord combination, wherein a fret distance is the number of frets plus one between the pair of note positions. The step 68 also includes determining a string distance between the pair of note positions, wherein the string distance is the number of strings plus one between a pair of note positions. Then the fret distance is multiplied by a first constant and then the string distance is multiplied by a second string constant, and then calculating the square root of the sum of the squares of the multiplied string and fret distances. A preference for particular fret positions may be controlled by altering one or more constants or performing a variation on the method described above. For example, the first constant and second constant need not be identical and the square-root operation may include other operations before or after, that may cause a non-linear variation in results from the method described above.

The step of testing the elements of the initial combination list for suitability is weighted according to a parameter configured to influence combination selection. The parameters configured to influence combination selection are selected from the group of parameters including preferred strings, distance characteristic of previous note group, distance characteristic of subsequent note group, and preferred string combinations. The process 55 includes selecting a combination with the best possible characteristics 74. The game objects further includes a graphical representation associated with the note position. The graphical representation includes a fingerboard grid array. The fingerboard grid array includes a string identifier and a fret identifier. The graphical representation also includes a note name. Thereby displaying the combination material as a guitar tab 78 and returns to reading the music data.

In operation of one embodiment of the invention, a user may learn, practice, and/or play an input instrument, such as but not limited to, a guitar, violin, etc. while viewing the musical information through a display module. A control module may function to adapt and/or connect the input instrument to the musical information the display module. In combination with the above, the system provides an interactive instrument and display. The graphical interface may mirror and/or be similar to the input instrument; thereby enabling a user to view the graphic interface and learn correct note positions, pitches, etc. on his or her input instrument.

It is understood that the above-described embodiments are only illustrative of the application of the principles of the present invention. The present invention may be embodied in other specific forms without departing from its spirit or essential characteristics. The described embodiment is to be considered in all respects only as illustrative and not restrictive. The scope of the invention is, therefore, indicated by the appended claims rather than by the foregoing description. All changes which come within the meaning and range of equivalency of the claims are to be embraced within their scope.

For example, although the figures indicate the note positions and the fingerboard positions on the virtual fingerboard and the input instrument, respectively, include color markings, it is contemplated that the note positions and/or the fingerboard positions may be coded in any manner contemplated in the art. Some non-limiting examples of coding include: patterns, symbols, markers recognizable via, touch and/or feel, and/or so forth.

Additionally, although the figures illustrate the rectangular shape of the plurality of note positions on the virtual fingerboard and the input instrument, it is understood the plurality of note positions and fingerboard positions may be indicated and/or comprised of any shape and/or form contemplated in the art. Some non-limiting examples of note positions and fingerboard positions include: square, elliptical, circular, and/or so forth.

In an alternative embodiment, the note positions and/or fingerboard positions on the virtual fingerboard and input instrument, respectively, may be coded via Braille and/or other such markings which are recognizable via touch or feel. A non-limiting example of such an embodiment may be found in U.S. Pat. No. 7,051,292 issued to Nagase, which is incorporated by reference herein.

Again, although the figures illustrate a six stringed input instrument and virtual fingerboard, it is envisioned that the input instrument and virtual fingerboard may comprise any stringed instrument contemplated in the art, such as but not limited to, guitar, violins, cellos, sitars, etc.

It is also envisioned that the musical information and/or input instrument may be adjusted and/or modified for users which use the left and/or right hand and/or fingers for play on a fingerboard. In a non-limiting example, the musical information may be adjusted for a left handed user by placing the virtual fingerboard at the substantial bottom extreme of the interface and subsequently directing the game objects vertically downward.

While particular modes are described and illustrated to be implemented in a particular order, it is envisioned that there are one or more embodiments wherein such modes may be implemented in any order, and/or in a different order, than that illustrated. Further, modes may be implemented in an animated sequence, as a screen refresh, or otherwise.

It is further envisioned that any of the above features, functions, module, embodiments, etc. described herein may be incorporated and/or embodied in a computer readable storage medium comprising computer readable program code and configured to execute on a processor.

It is expected that the invention may include numerous variations of the designs and/or include a variety of aesthetic features, such as but not limited to logos, icons, music and/or other symbols, and/or so forth.

Thus, while the present invention has been fully described above with particularity and detail in connection with what is presently deemed to be the most practical and preferred embodiment of the invention, it will be apparent to those of ordinary skill in the art that numerous modifications, including, but not limited to, variations in size, materials, shape, form, function and manner of operation, assembly and use may be made, without departing from the principles and concepts of the invention as set forth in the claims. Further, it is contemplated that an embodiment may be limited to consist of, or to consist essentially of, one or more of the features, functions, structures, methods described herein.

What is claimed is:

1. A method of instructing a user to read musical notation through interaction with a graphical user interface and an input instrument representative of a stringed instrument, comprising the steps of:
   a) generating the graphical user interface, having a first mode, including a virtual fingerboard positioned substantially along a vertical extreme of the interface, the virtual fingerboard including:
   a first linear array representing a first string having a first frequency range;
   a second linear array representing a second string having a second frequency range, wherein the second frequency range overlaps the first frequency range associated with a string; and
   a plurality of note positions, each note position having a corresponding fingerboard position on the input instrument;
   wherein the first linear array, the second linear array, and the plurality of note positions form a grid;
   b) displaying the first linear array and the second linear array in a second mode such that portions of the first linear array and the second linear array having overlapping frequency ranges are substantially vertically aligned;
   c) incorporating a music file into the graphical user interface, wherein the music file contains data corresponding to an arrangement of a plurality of musical notes in sequence, having a rhythmic pattern, and represented by at least one game object;
   d) directing the game object in substantially and substantially straight trajectory, toward a note position on the virtual fingerboard corresponding to the musical notes; and
   e) adjusting a toggle module configured to selectably toggle the second linear array between able and disabled modes.

2. The method of claim 1, wherein the toggle module, comprising:
   a) an auto module, configured to selectably toggle the second linear array to an auto mode;
   b) a manual module, configured to selectably toggle the second linear array to a manual mode; and
   c) a tempo module, configured to adjust the tempo of the second linear array.

3. The method of claim 1, wherein the toggle module includes a stringed select module configured to select a string of the second linear array to be displayed about the grid.

4. A method of instructing a user to read musical notation through interaction with a graphical user interface and an input instrument representative of a stringed instrument, comprising the steps of:
   a) generating the graphical user interface, having a first mode, including a virtual fingerboard positioned substantially along a vertical extreme of the interface, the virtual fingerboard including:
   a first linear array representing a first string having a first frequency range;
   a second linear array representing a second string having a second frequency range, wherein the second frequency range overlaps the first frequency range associated with a string; and
   a plurality of note positions, each note position having a corresponding fingerboard position on the input instrument;
   wherein the first linear array, the second linear array, and the plurality of note positions form a grid;
   b) displaying the first linear array and the second linear array in a second mode such that portions of the first linear array and the second linear array having overlapping frequency ranges are substantially vertically aligned;
   c) incorporating a music file into the graphical user interface, wherein the music file contains data corresponding to an arrangement of a plurality of musical notes in sequence, having a rhythmic pattern, and represented by at least one game object;
   d) directing the game object in substantially and substantially straight trajectory, toward a note position on the virtual fingerboard corresponding to the musical notes;
   e) wherein the game objects include identifying marks associated with note positions;
   f) wherein the identifying marks include grid notation associated with selecting a note position on a particular linear array;
   g) wherein the game objects are generated by an game object generation module according to a object generation process, comprising the steps of:
   g1) reading music data;
   g2) generating an initial permutation list of degenerate note position possibilities for the note information read from the music data;
   g3) generating an initial combination list of note position combinations for related notes from the music data;
   g4) testing elements of initial combination list for suitability; and
   g5) selecting a combination from the combination list.

5. The method of instructing a user to read musical notation of claim 4, wherein the step of testing elements of the initial combination list for suitability includes calculating a maximum fret distance between notes of a chord and comparing that maximum fret distance against a pass/fail threshold.

6. The method of claim 5, wherein the step of testing elements of the initial combination list for suitability further includes calculating a distance characteristic of a plurality of combinations from the initial list.

7. The method of claim 6, wherein the step of calculating a maximum fret distance includes:
   determining a fret distance between a pair of note positions in a chord combination, wherein a fret distance is the number of frets plus one between the note positions;
   determining a string distance between the pair of note positions, wherein the string distance is the number of strings plus one between the note positions;

multiplying the fret distance by a first constant;

multiplying the string distance by a second constant; and calculating the square root of the sum of the squares of the multiplied distances.

8. The method of claim 4, wherein the step of testing is weighted according to a parameter configured to influence combination selection.

9. The method of claim 8, wherein the parameter is selected from the group of parameters consisting of preferred strings, distance characteristics from previous note groups, distance characteristic of subsequent note groups, and preferred stringed combinations.

10. A method of instructing a user to read musical notation through interaction with a graphical user interface and an input instrument representative of a stringed instrument, comprising the steps of:

a) generating the graphical user interface, having a first mode, including a virtual fingerboard positioned substantially along a vertical extreme of the interface, the virtual fingerboard including:

a first linear array representing a first string having a first frequency range;

a second linear array representing a second string having a second frequency range, wherein the second frequency range overlaps the first frequency range associated with a string; and a plurality of note positions, each note position having a corresponding fingerboard position on the input instrument;

wherein the first linear array, the second linear array, and the plurality of note positions form a grid;

b) displaying the first linear array and the second linear array in a second mode such that portions of the first linear array and the second linear array having overlapping frequency ranges are substantially vertically aligned;

c) incorporating a music file into the graphical user interface, wherein the music file contains data corresponding to an arrangement of a plurality of musical notes in sequence, having a rhythmic pattern, and represented by at least one game object;

d) directing the game object in substantially and substantially straight trajectory, toward a note position on the virtual fingerboard corresponding to the musical notes; and e) wherein game objects include a graphical representation associated with note positions.

11. The method of claim 10, wherein the graphical representation include a fingerboard grid array.

12. The method of claim 11, wherein the fingerboard grid array includes a string identifier and a fret identifier.

13. The method of claim 10, wherein the graphical representation includes a note name.

\* \* \* \* \*